United States Patent [19]

Gieger

[11] Patent Number: 5,197,177
[45] Date of Patent: Mar. 30, 1993

[54] DEVICE FOR REPAIRING OR RENEWING CONTAINER NOZZLES OF ENAMELLED APPARATUS

[75] Inventor: Eckhard Gieger, Leverkusen, Fed. Rep. of Germany

[73] Assignee: Bayer Aktiengesellschaft, Leverkusen, Fed. Rep. of Germany

[21] Appl. No.: 857,703

[22] Filed: Mar. 25, 1992

Related U.S. Application Data

[63] Continuation of Ser. No. 526,200, May 21, 1990, abandoned.

[30] Foreign Application Priority Data

Jun. 2, 1989 [DE] Fed. Rep. of Germany ....... 3917989

[51] Int. Cl.$^5$ .............................................. B23P 6/00
[52] U.S. Cl. .................... 29/402.15; 239/600
[58] Field of Search ............... 231/550, 551, 591, 600; 29/402.14, 402.15, 890.042

[56] References Cited

U.S. PATENT DOCUMENTS

| | | | |
|---|---|---|---|
| 2,941,286 | 6/1960 | Wory | 29/402.15 |
| 3,121,536 | 2/1964 | McKibben | 239/600 |
| 4,084,750 | 4/1972 | Fett | 239/600 |
| 4,473,171 | 9/1984 | Nunlist | 239/600 |

FOREIGN PATENT DOCUMENTS 480395 12/1936 United Kingdom ................ 239/591

Primary Examiner—Andres Kashnikow
Assistant Examiner—Kevin Weldon
Attorney, Agent, or Firm—Sprung Horn Kramer & Woods

[57] ABSTRACT

The device for repairing or renewing nozzles (1) of containers (2) consists of a surface-protected replacement nozzle (3) with an inner flange (4) and an outer flange (5), which is passed through the nozzle (1) to be repaired or through the associated container opening (6), so that the inner flange (4) annularly overlaps the inner container wall outside the container opening (6), and of a sealing ring (7) arranged between the inner flange (4) and the inner container wall. Under the effect of a clamping device (8,9,10), which is supported on one side by the outer container wall or by the original nozzle (1) and, on the other side, by the outer flange (5) of the replacement nozzle (3), the replacement nozzle (3) is fixed to the container (2) and, with the inner flange (4), pressed against the sealing ring (7) and the inner container wall.

1 Claim, 2 Drawing Sheets

DEVICE FOR REPAIRING OR RENEWING CONTAINER NOZZLES OF ENAMELLED APPARATUS

This application is a continuation, of application Ser. No. 526,200, filed May 21, 1990, now abandoned.

Enamelled containers or vessels are frequently used in industry. Metal surfaces protected by enamelling are effectively protected against the corrosive effect of almost all aggressive media. However, the anti-corrosive effect only remains intact as long as the enamel layer is undamaged and free from pores. On account of its brittleness, the enamel layer is particularly sensitive to severe mechanical stressing and impact. In addition, pores formed during the enamelling process, some of which are concealed, are in danger of breaking open.

In view of these particular dangers, methods for repairing pores in, and damage to, the enamel layer have been developed over the years. In the most widely used repair method, the damaged areas are covered with plugs, patches or collars of noble metal, particularly tantalum. The disadvantage of this is that, generally, the noble metal affords less protection against corrosion than the enamel layer. In addition, the sealing effect of the repair cannot be checked from outside so that, in the event of creepage of the seal, any attack on the unprotected base material of the apparatus can only be detected at a late stage, often too late for further repair.

Hitherto, there have been no comparable possibilities for repairing container nozzles although damage around nozzles and particularly around bottom nozzles of stirred containers occurs relatively frequently. The cause of this damage is that the nozzle zone, which is particularly sensitive because of its narrow radii, coincides here with the region of maximum mechanical stressing (abrasion, foreign bodies, assembly errors).

The problem addressed by the present invention was to provide a device for repairing or renewing nozzles of surface-protected containers which satisfied all the following requirements:

The existing nozzles were to remain useable.
The replacement nozzle, including the repair zone, was to afford full surface protection.
The tightness of the repair in terms of sealing was to be able to be checked from outside.

Hitherto, the only way out has been the expensive fitting of a new nozzle in conjunction with re-enamelling of the entire container unless one of the above-mentioned requirements could be waived.

According to the invention, this problem is solved by a device embodying the following features:

a) A surface-protected replacement nozzle with an inner flange and an outer flange is passed through the nozzle to be repaired or through the associated container opening so that the inner flange annularly overlaps the inner container wall outside the container opening.
b) A sealing ring is arranged between the inner flange and the inner container wall.
c) The replacement nozzle is fixed to the container by a clamping device which is supported on one side by the outer container wall or by the original (damaged) nozzle and, on the other side, by the outer flange of the replacement nozzle and is pressed with the inner flange against the sealing ring and the inner container wall.

Accordingly, the invention is based on the fact that an enamelled or PTFE-coated special nozzle (replacement nozzle) is pushed into the damaged container nozzle or through the opening present there from inside and the seal placed between the special nozzle and the container is pressed on by means of the clamping device.

The following advantages are afforded by the invention:

An nozzle repaired in this way can be re-used without any restrictions.
In the case of repair work to, or replacement of, the outlet nozzle of a container, pre-assembled modified outlet valves may be used.
The repair can be inspected for leaks from outside.
The enamel can still be tested by high voltage and probe.
Repairs to pressure vessels can also be carried out in this way.
The parts required for the repair can be kept ready in the form of a set, thus minimizing down times caused by the repair. In addition, the repair does not have to be carried out by specially trained skilled personnel.
The container is ready for unlimited use again immediately after the repair.
Finally, the device according to the invention is also suitable for the subsequent introduction of nozzles into surface-protected containers.

Examples of embodiment of the invention are described in detail in the following with reference to the accompanying drawings, wherein.

Figure 1:
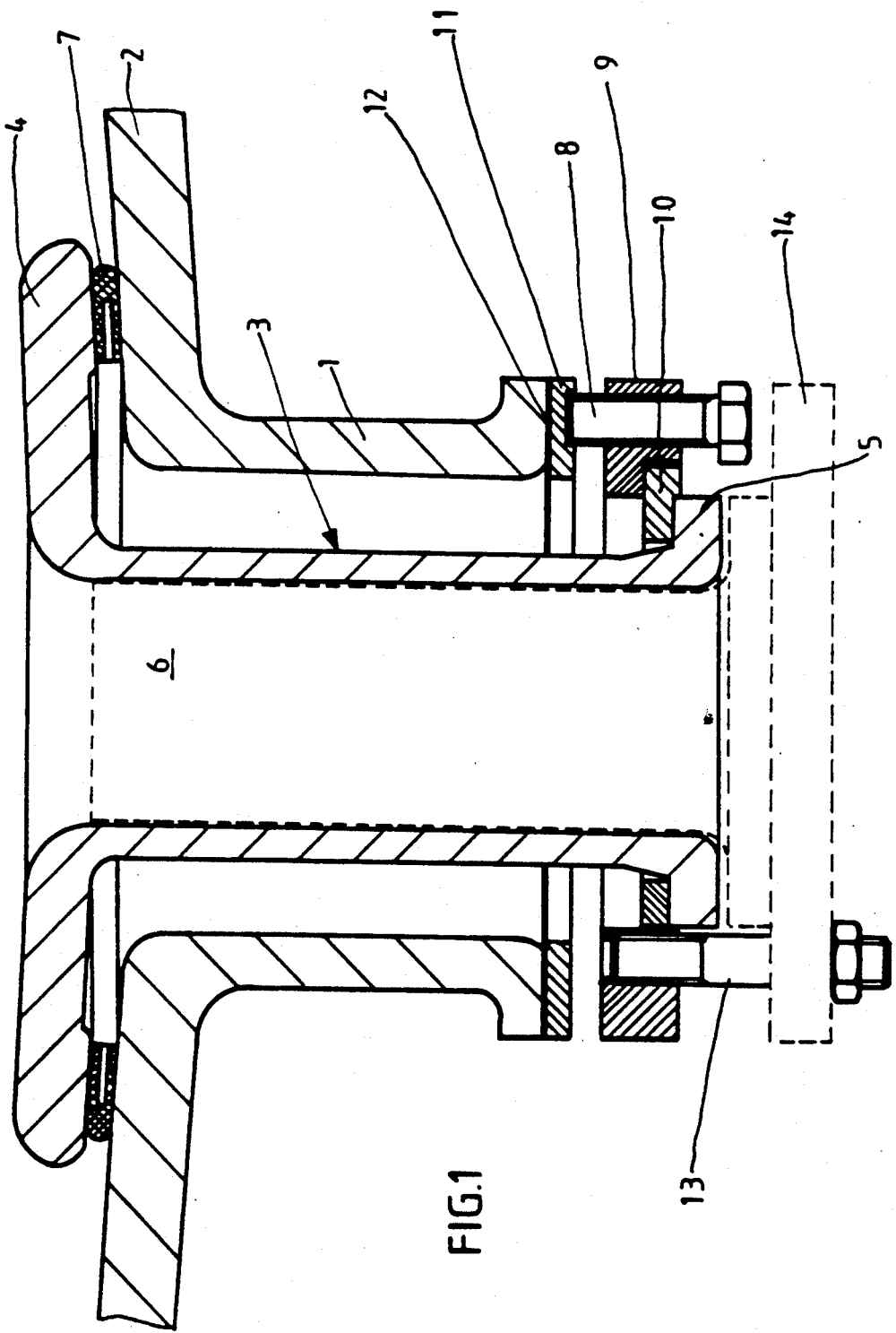
FIG. 1 is a section showing the introduction of a special nozzle for repair purposes into a damaged container nozzle.

Referring to FIG. 1, a pre-assembled, surface-protected (for example enamelled or PTFE-coated) repair nozzle 3 (special nozzle) comprising an inner flange 4 and an outer flange 5 is inserted into a damaged nozzle 1 of a container 2. With part of its flange surface, the inner flange 4 annularly overlaps part of the inner container wall in the vicinity of the outer circumference of the container opening 6. A sealing ring 7 is arranged between this flange surface and the inner container wall. The seal 7 is fixed in position by means of screws 8 via a loose flange 9 (axially displaceable flange), which on one side is supported by the outer flange of the replacement nozzle 3 via a split ring 10 and, on the other side, is supported by the nozzle 1 of the container 2. Accordingly, the clamping device consisting of the parts 8, 9 and 10 is used simultaneously for assembly, centering and sealing (via the sealing ring 7) of the replacement nozzle 3. One particular advantage in this regard is that the screws 8 are arranged outside the container 2 and are readily accessible.

A pressure washer 11 and a thin, soft support 12 may be arranged between the screws 8 and the container nozzle 1 to protect the container nozzle 1.

Standard fittings, for example in the form of a modified nozzle valve 14, may be fixed at the end of the replacement or special nozzle 3 by means of pin screws 13 screwed into the loose flange 9.

Figure 2:
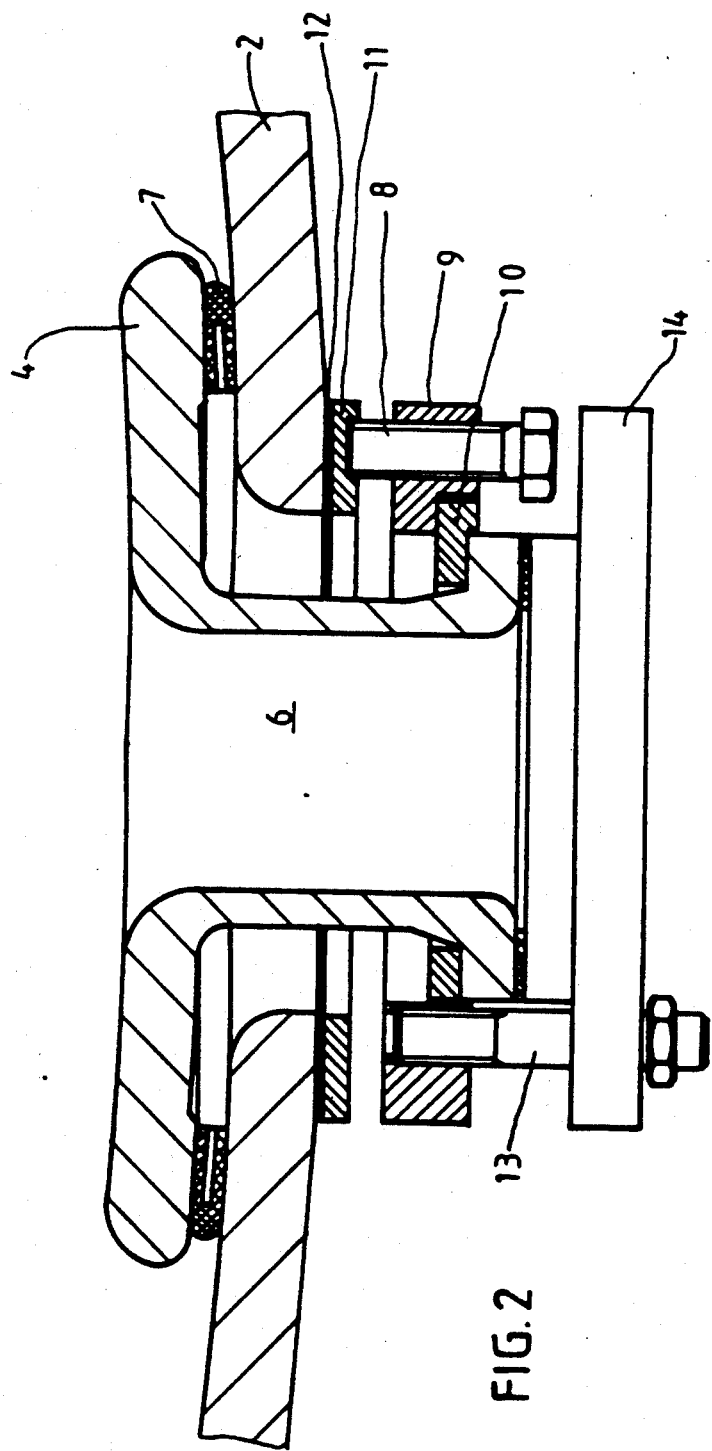
FIG. 2 is another section showing the fitting of the special nozzle in a container opening.

The embodiment shown in FIG. 2 is similar to the embodiment shown in FIG. 1. In contrast to FIG. 1, however the clamping device 8,9,10 is not supported by the container nozzle, but rests directly on the outer wall of the container 2. To this end, the damaged nozzle 1 originally present has been removed.

The embodiment shown in FIG. 2 may also be successfully used where additional nozzles are to be fitted to enamelled vessels.

By virtue of the ease of assembly (no grinding or welding !), special nozzles of the type in question may even be fitted as a precaution to original container nozzles at particularly vulnerable places in order to increase reliability in operation.

I claim:

1. A method of repairing or renewing an original nozzle (1) of a container (2), said original nozzle being formed of a first tube with a central longitudinal axis and having a first, inner diameter and an axial length that is substantially greater than the total thickness of the wall, said original nozzle thus extending substantially beyond the outer surface of the wall of the container that surrounds said nozzle, said method comprising the steps of:

a) passing a surface-protected replacement nozzle (3) formed of a second tube with an inner flange (4) and an outer flange (5) at opposite ends thereof, through the original nozzle (1) to be repaired so that the inner flange (4) annularly overlaps the inner surface of the wall that surrounds the original nozzle (1) and the outer flange (5) protrudes out the original nozzle opening, said replacement nozzle being aligned coaxially with the original nozzle, said second tube and said outer flange having a second, outer diameter which is less than said first diameter;

b) arranging a sealing ring (7) between the inner flange (4) and the inner container wall; and c) fixing the replacement nozzle (3) to the container (2) by means of a clamping device (8,9,10) which is supported on one side of the outer surface of the container wall or by the original nozzle (1) and, on the other side, by the outer flange (5) of the replacement nozzle (3) and which presses the inner flange (4) against the sealing ring (7) and the inner container wall.

* * * * *